US012754294B2

(12) United States Patent
Nakano

(10) Patent No.: US 12,754,294 B2
(45) Date of Patent: Oct. 6, 2026

(54) OPTICAL APPARATUS, IN-VEHICLE SYSTEM INCLUDING OPTICAL APPARATUS, AND MOVING APPARATUS INCLUDING OPTICAL APPARATUS

(71) Applicant: CANON KABUSHIKI KAISHA, Tokyo (JP)

(72) Inventor: Masatsugu Nakano, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 875 days.

(21) Appl. No.: 18/168,500

(22) Filed: Feb. 13, 2023

(65) Prior Publication Data

US 2023/0266444 A1 Aug. 24, 2023

(30) Foreign Application Priority Data

Feb. 24, 2022 (JP) ................................ 2022-026811

(51) Int. Cl.

| | |
|---|---|
| ***G01S 7/481*** | (2006.01) |
| ***G01S 7/48*** | (2006.01) |
| ***G01S 7/497*** | (2006.01) |
| ***G01S 17/42*** | (2006.01) |
| ***G01S 17/931*** | (2020.01) |

(52) U.S. Cl.

CPC .......... *G01S 7/4817* (2013.01); *G01S 7/4808* (2013.01); *G01S 7/4812* (2013.01); *G01S 7/4818* (2013.01); *G01S 7/497* (2013.01); *G01S 17/42* (2013.01); *G01S 17/931* (2020.01)

(58) Field of Classification Search

None

See application file for complete search history.

(56) References Cited

U.S. PATENT DOCUMENTS

| | | | | |
|---|---|---|---|---|
| 4,042,822 | A * | 8/1977 | Brandewie ............ | G01S 7/4817 356/28 |
| 2017/0307876 | A1* | 10/2017 | Dussan ................. | G01S 7/4814 |
| 2020/0110161 | A1* | 4/2020 | Talty ..................... | G01S 7/4817 |
| 2021/0354700 | A1* | 11/2021 | Nakano ................. | G01S 7/4811 |

(Continued)

FOREIGN PATENT DOCUMENTS

| | | |
|---|---|---|
| JP | S53031148 A | 3/1978 |
| JP | H01134285 A | 5/1989 |
| JP | 2731565 B2 | 3/1998 |

(Continued)

*Primary Examiner* — Eric L Bolda

(74) *Attorney, Agent, or Firm* — Canon U.S.A., Inc. IP Division

(57) ABSTRACT

An optical apparatus includes a first deflection unit configured to deflect illumination light from a light source unit to scan an object and deflect reflected light from the object, a first light guiding unit configured to guide the illumination light from the light source unit to the first deflection unit and guide the reflected light from the first deflection unit to a light receiving unit, and a second light guiding unit configured to guide the illumination light from the light source unit to the light receiving unit, wherein the first light guiding unit includes a first passing region and a reflective region, and wherein the second light guiding unit is configured to guide, to the light receiving unit, light reflected in the reflective region without going through the object among the illumination light from the first deflection unit.

22 Claims, 9 Drawing Sheets

(56) References Cited

U.S. PATENT DOCUMENTS

2022/0334260 A1* 10/2022 Okano .................... G01S 17/34

FOREIGN PATENT DOCUMENTS

| | | | | |
|---|---|---|---|---|
| JP | 2000235451 | A | | 8/2000 |
| JP | 2010-204015 | A | * | 9/2010 |
| JP | 2012073216 | A | | 4/2012 |
| JP | 5472572 | B2 | | 4/2014 |
| JP | 2020177012 | A | | 10/2020 |
| JP | 2021177183 | A | | 11/2021 |
| JP | 2021181980 | A | | 11/2021 |

* cited by examiner

OPTICAL APPARATUS, IN-VEHICLE SYSTEM INCLUDING OPTICAL APPARATUS, AND MOVING APPARATUS INCLUDING OPTICAL APPARATUS

BACKGROUND

Technical Field

The aspect of the embodiments relates to an optical apparatus that receives reflected light from an illuminated target object to detect the target object.

Description of the Related Art

As a distance-measuring apparatus that measures a distance to a target object, known is a distance-measuring apparatus that causes a deflection unit to deflect illumination light from a light source to scan the target object, and that calculates the distance to the target object based on time until reception of reflected light from the target object or a phase of the reflected light. Such a distance-measuring apparatus is to guarantee accuracy in distance measurement in response to a change in environment such as humidity and temperature.

Japanese Patent Application Laid-Open No. 2010-204015 and Japanese patent No. 5472572 each describe a measuring apparatus capable of correcting a distance to a target object based on information obtained by guiding, with an optical fiber, illumination light deflected by a deflection unit before being incident on the target object, to a light receiving unit.

In the distance-measuring apparatus described in each of Japanese Patent Application Laid-Open No. 2010-204015 and Japanese patent No. 5472572, however, illumination light deflected by the deflection unit is directly incident on the optical fiber without going through another member, and thus there is a small degree of freedom in arrangement of an incident surface of the optical fiber and it is difficult to downsize the entire apparatus.

SUMMARY

According to an aspect of the embodiments, an optical apparatus includes a first deflection unit configured to deflect illumination light from a light source unit to scan an object and deflect reflected light from the object, a first light guiding unit configured to guide the illumination light from the light source unit to the first deflection unit and guide the reflected light from the first deflection unit to a light receiving unit, and a second light guiding unit configured to guide the illumination light from the light source unit to the light receiving unit, wherein the first light guiding unit includes a first passing region through which the illumination light from the light source unit passes and a reflective region in which the reflected light from the first deflection unit is reflected, and wherein the second light guiding unit is configured to guide, to the light receiving unit, light reflected in the reflective region without going through the object among the illumination light from the first deflection unit.

Further features of the disclosure will become apparent from the following description of exemplary embodiments with reference to the attached drawings.

DESCRIPTION OF THE EMBODIMENTS

Exemplary embodiments of the disclosure will be described with reference to the drawings. In each drawing, there may be cases where a reduced scale is different from an actual reduced scale for descriptive purposes. In each drawing, an identical member is denoted by an identical reference number, and an overlapping description is omitted.

Figure 1:
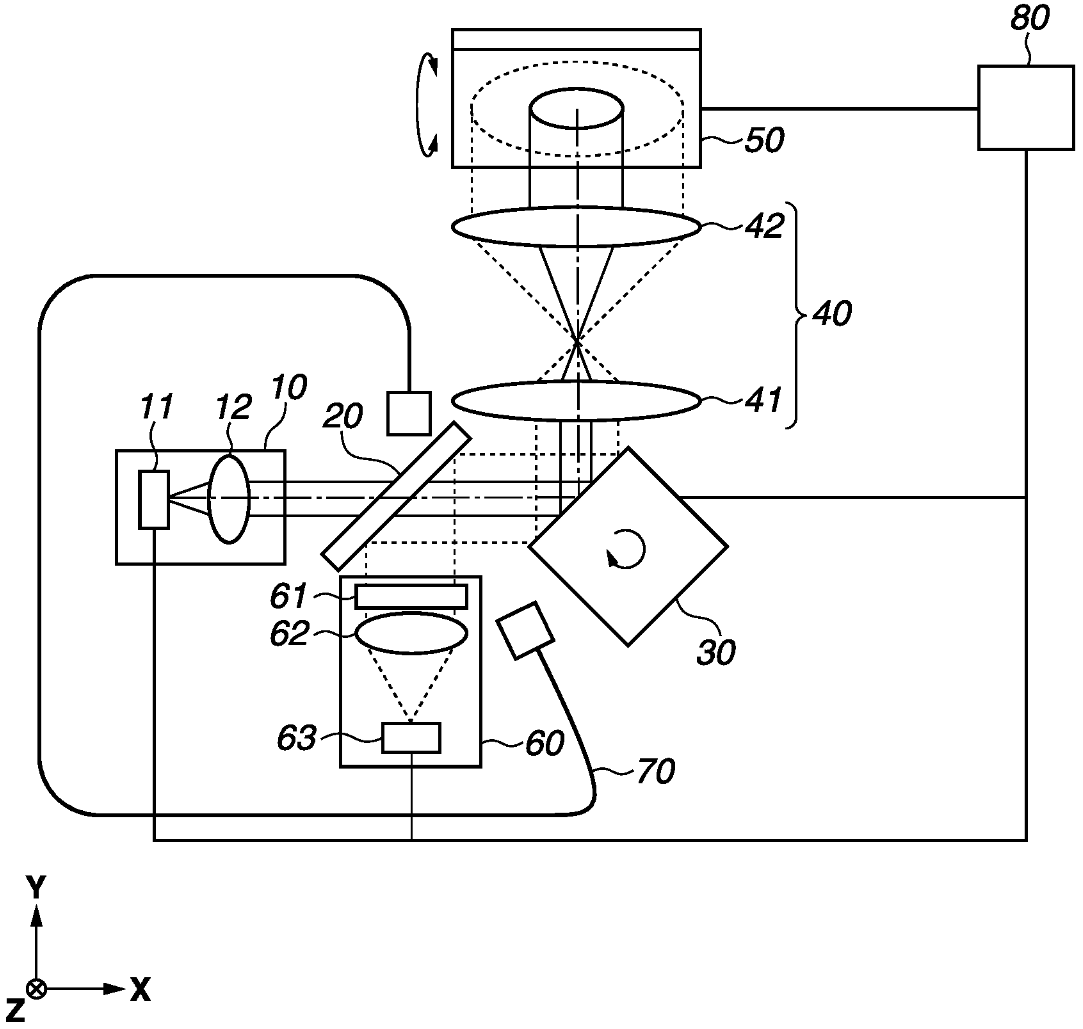
FIG. 1 is a schematic view illustrating a main section of an optical apparatus according to a first exemplary embodiment.
Figure 2A:
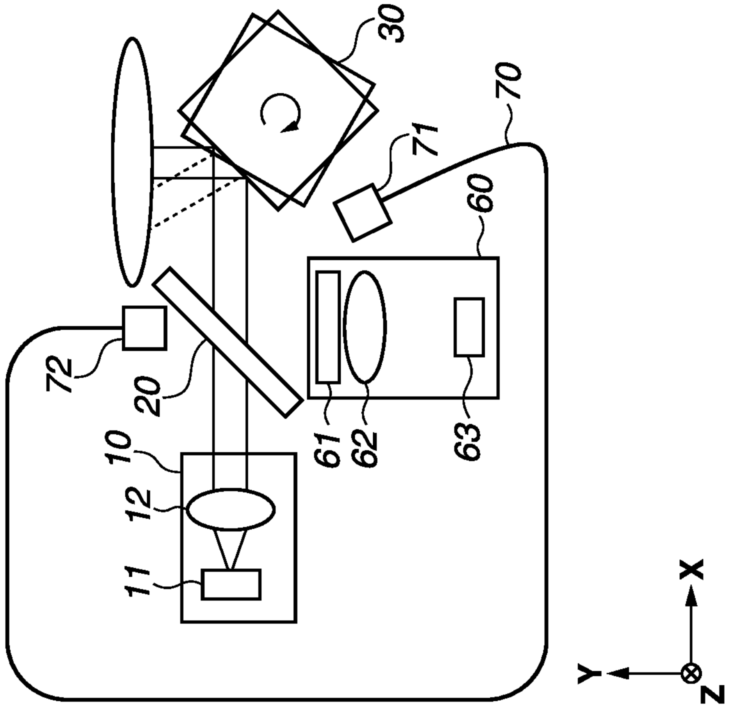
FIGS. 2A and 2B are enlarged views each illustrating a main section of the optical apparatus according to the first exemplary embodiment.
Figure 2B:
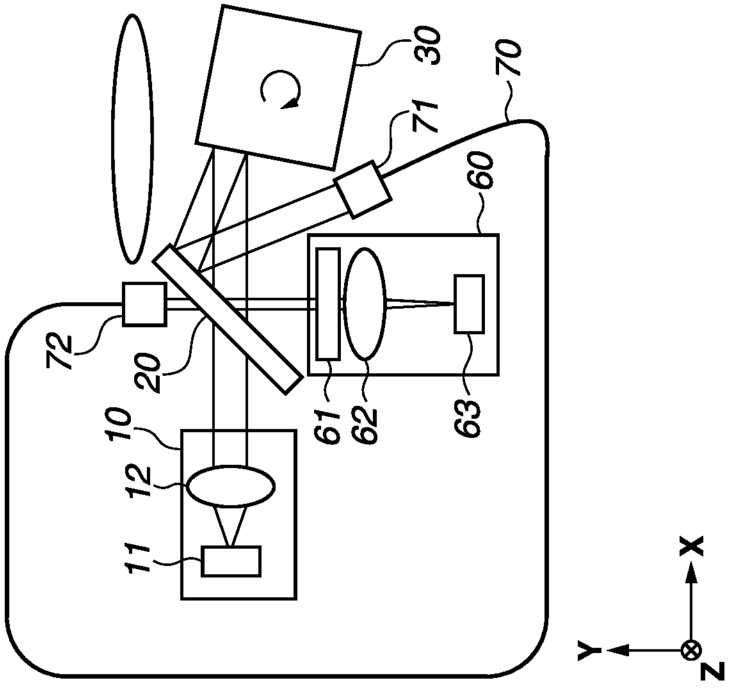

FIG. 1 is a schematic view (schematic diagram) illustrating a main section of an optical apparatus 1 according to a first exemplary embodiment when viewed from a target object (not illustrated) side (−Z-side). The optical apparatus 1 includes a light source unit 10, a first light guiding unit 20 (branch unit), a first deflection unit 30, an optical system 40, a second deflection unit 50, a light receiving unit 60, a second light guiding unit 70, and a control unit 80. However, the optical apparatus 1 is to include at least the first light guiding unit 20, the first deflection unit 30, and the second light guiding unit 70, and the other members may be another devices (units) detachably mounted on the optical apparatus 1, as necessary. FIGS. 2A and 2B are enlarged views each illustrating a main section of the optical apparatus 1. FIG. 2A illustrates a first light path when light (illumination light) travels from the light source unit 10 to the target object. FIG. 2B illustrates a second light path when illumination light travels to the second light guiding unit 70 without going through the target object.

The optical apparatus 1 can be used as a detection apparatus (imaging apparatus) that receives light (reflected light) from the target object to detect (capture an image of) the target object or a distance-measuring apparatus that acquires a distance to the target object (distance information). The optical apparatus 1 according to the present exemplary embodiment employs a technique called light detection and ranging (LiDAR) for calculating the distance to the target object based on time until reception of reflected light from the target object and a phase of the reflected light.

The light source unit 10 includes a light source 11 and an optical element 12. As the light source 11, a semiconductor laser, which is a laser with a high degree of energy concentration and high directivity, can be used. As the semiconductor laser, for example, a vertical cavity surface emitting laser (VCSEL) may be used. In a case where the optical apparatus 1 is applied to an automobile, a traffic light machine, or the like, there is a possibility that the target object includes a human. Hence, as the light source 11, a light source that emits infrared light that has a low impact on human eyes is adopted. A wavelength of illumination light emitted from the light source 11 according to the present exemplary embodiment is 905 nm within a near-infrared range.

The optical element 12 has a function of changing a degree of convergence of illumination light emitted from the light source 11.

The optical element 12 according to the present exemplary embodiment is a collimator lens (light-condensing element) that converts (collimates) diverging light emitted from the light source 11 to parallel light. However, the parallel light mentioned herein includes not only parallel light in a strict sense but also substantially parallel light such as weak diverging light and weak converged light. The light source unit 10 may include a light shielding member (aperture stop) that restricts illumination light from the optical element 12 to determine a diameter of luminous flux (width of luminous flux).

Figure 3B:
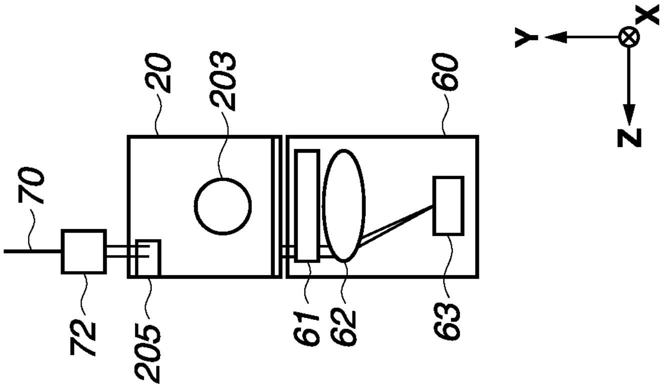
FIGS. 3A and 3B are schematic views each illustrating a main section of a first light guiding unit according to the first exemplary embodiment.
Figure 3A:
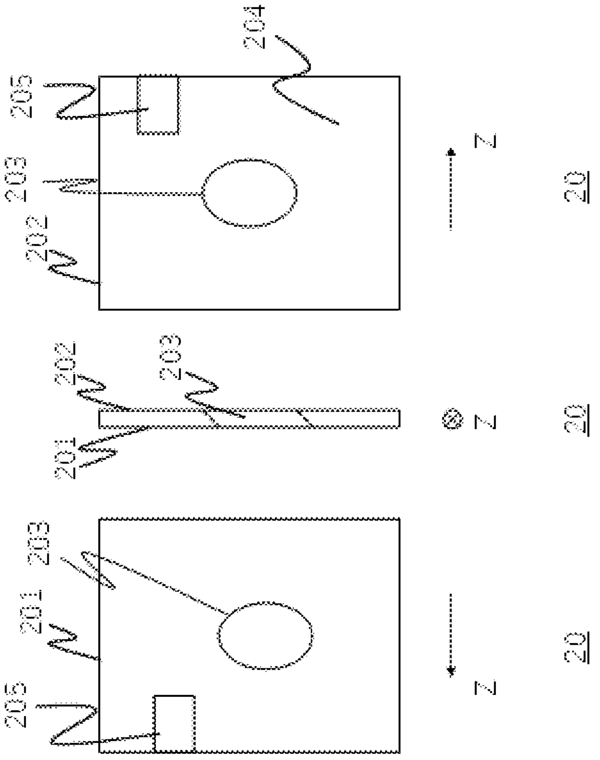

The first light guiding unit 20 is a member (branch element) for branching a light path (illumination light path) used when illumination light from the light source unit 10 travels to the target object and a light path (received light path) used when reflected light from the target object travels to the light receiving unit 60. That is, the first light guiding unit 20 guides illumination light from the light source unit 10 to the first deflection unit 30 and also guides reflected light from the first deflection unit 30 to the light receiving unit 60. FIGS. 3A and 3B are schematic views each illustrating a main section of the first light guiding unit 20 according to the present exemplary embodiment. FIG. 3A is a diagram illustrating a first surface 201 of the first light guiding unit 20 on the light source unit 10 side and a second surface 202 of the first light guiding unit 20 on the first deflection unit 30 side when viewed from a normal direction, and a cross-sectional view (XY cross section) of the first light guiding unit 20 at a position including a first passing region 203. FIG. 3B is a diagram illustrating the light paths illustrated in FIG. 2B when viewed from a −X side.

As illustrated in FIG. 3B, the first light guiding unit 20 includes the first passing region 203 through which illumination light from the light source unit 10 passes, a reflective region 204 in which reflected light from the first deflection unit 30 is reflected, and a second passing region 205 through which light from the second light guiding unit 70 passes. The first passing region 203 and the second passing region 205 according to the present exemplary embodiment are holes (apertures) arranged in the first light guiding unit 20, and penetrate from the first surface 201 to the second surface 202. The reflective region 204 corresponds to a reflective film (reflective layer) that is arranged on the second surface 202 in a region excluding the first passing region 203 and the second passing region 205, and that consists of a metal, a dielectric body, or the like. That is, the first light guiding unit 20 according to the present exemplary embodiment consists of a perforated mirror (with holes) as a single reflective member.

The first passing region 203 and the second passing region 205 according to the present exemplary embodiment are holes, but translucent members may be arranged at respective positions of the holes, as necessary. In this case, for example, the first light guiding unit 20 can be manufactured by arrangement of the reflective film as the reflective region in a portion excluding portions corresponding to the first passing region 203 and the second passing region 205 in the translucent member. As the first light guiding unit 20, not only the perforated mirror but also a beam splitter, a prism, a half mirror, or the like can be used. The first light guiding unit 20 may consist of a plurality of optical members.

The first light guiding unit 20 according to the present exemplary embodiment is arranged so that the first surface 201 and the second surface 202 are non-parallel to both an optical axis direction (X-direction) of the light source unit 10 and an optical axis direction (Y-direction) of the light receiving unit 60 to branch the illumination light path and the received light path. Accordingly, as illustrated in FIG. 3A, an inner surface in the first passing region 203 is non-orthogonal to the first surface 201 and the second surface 202 (non-parallel to respective normal lines). For this reason, respective positions of the first passing region 203 on the first surface 201 and the second surface 202 are different from each other in a direction within a plane of paper in FIG. 3A (a direction orthogonal to the normal line of each surface). The same applies to the second passing region 205. A light shielding film (absorption film) for blocking (absorbing) light is to be arranged in a region excluding the first passing region 203 and the second passing region 205 on the first surface 201 to prevent light that is reflected in the region from reaching the light receiving unit 60.

In this manner, the optical apparatus 1 according to the present exemplary embodiment includes the first light guiding unit 20, and thereby constitutes a coaxial system in which a part of the illumination light path from the light source unit 10 to the first deflection unit 30 and a part of the reflected light path from the first deflection unit 30 to the light receiving unit 60 are matched with each other. This system can reduce the number of components and downsize the entire apparatus in comparison with a non-coaxial system in which the illumination light path and the reflected light path are not matched with each other.

The first deflection unit 30 (first scanning unit) is a member (deflection element) for deflecting illumination light from the first light guiding unit 20 to scan the target object, and also deflecting reflected light from the target object to guide the reflected light to the first light guiding unit 20. The first deflection unit 30 according to the present exemplary embodiment consists of a single driven mirror (movable mirror). Specifically, the first deflection unit 30 has four deflection surfaces (reflective surfaces), and is a rotatable polygon mirror (polygon mirror) that is rotatable about a first rotation axis that is parallel to a Z-direction. The first deflection unit 30 is capable of scanning the target object in the X-direction by deflecting illumination light with the rotating deflection surfaces. The number of deflection surfaces of the first deflection unit 30 may be three or less or five or more, as necessary.

The first rotation axis of the first deflection unit 30 according to the present exemplary embodiment is arranged to be non-parallel to the optical axis (alternate long and short dash line) of the light source unit 10 illustrated in FIG. 1. This configuration can downsize each deflection surface in comparison with a case where the first rotation axis is parallel to (matched with) the optical axis of the light source unit 10 like the apparatus described in Japanese Patent Application Laid-Open No. 2010-204015. In the case where the first rotation axis is parallel to the optical axis of the light source unit 10, each deflection surface of the first deflection unit 30 needs to be inclined with respect to the optical axis of the light source unit 10 (principal ray of illumination light) on the cross section including the first rotation axis, whereby it becomes difficult to downsize each deflection surface. Especially, in a case where a unit having many deflection surfaces such as a polygon mirror is adopted as the first deflection unit 30, a weight of the first deflection unit 30 increases with an increase in size of each deflection surface, whereby a load on a drive unit for rotating the first deflection unit 30 increases. The drive unit is not illustrated. Accordingly, the first rotation axis and the optical axis of the light source unit 10 are to be non-parallel like the present exemplary embodiment.

The optical system 40 is a member for guiding illumination light from the first deflection unit 30 to the target object, and also guiding reflected light from the target object to the first deflection unit 30. The optical system 40 according to the present exemplary embodiment consists of a plurality of lenses having refractive power (power), and is an optical system without refractive power as the entire system (afocal system). Specifically, the optical system 40 is a telescope that increases a diameter of illumination light from the first deflection unit 30 and decreases a diameter of reflected light from the target object. The optical system 40 according to the present exemplary embodiment consists of a first lens 41 with positive power and a second lens 42 with positive power. The first lens 41 and the second lens 42 are sequentially arranged in this order from the first deflection unit 30 side. The configuration of the optical system 40 is not limited thereto, and the optical system 40 may consist of one lens or three or more lenses, as necessary.

An absolute value of an optical magnification (lateral magnification) of the optical system 40 according to the present exemplary embodiment is more than 1 ($|\beta|>1$). With this configuration, a deflection angle of a principal ray of illumination light emitted from the optical system 40 becomes smaller than a deflection angle of a principal ray of illumination light that is deflected by the first deflection unit 30 and incident on the optical system 40, whereby it becomes possible to increase resolution power at the time of detection of the target object. Illumination light from the light source unit 10 is deflected by the first deflection unit 30 via the first light guiding unit 20 is magnified by the optical system 40 according to an optical magnification $\beta$, and illuminates the target object via the second deflection unit 50, which will be described below. Reflected light from the target object is reduced by the optical system 40 according to an optical magnification $1/\beta$ is deflected by the first deflection unit 30, and reaches the light receiving unit 60.

In this manner, in a case where the optical system 40 is arranged on the target object side of the first deflection unit 30, the diameter of illumination light can be increased. Accordingly, a sufficiently large region can be illuminated even if a spread angle (divergent angle) of illumination light is reduced. In this way, sufficient illuminance and resolution power can be also ensured in a case where the target object is at a long distance. Increasing a pupil diameter using the optical system 40 enables obtaining of a larger amount of reflected light from the target object, and can thereby increase a distance to be measured and accuracy in distance measurement. The optical system 40 may not be the telescope that increases the diameter of illumination light, and may be an optical system that reduces the diameter of illumination light, as necessary. The optical system 40 may not be the afocal system, and may be an optical system having refractive power as the entire system, as necessary. In a case where the target object is at a close distance, the optical system 40 may be removed, as necessary.

The second deflection unit 50 (second scanning unit) is a member for deflecting illumination light from the first deflection unit 30 to scan the target object, and also deflecting reflected light from the target object to guide the reflected light to the first deflection unit 30. The second deflection unit 50 according to the present exemplary embodiment consists of the single driven mirror (movable mirror). Specifically, the second deflection unit 50 has one deflection surface (reflective surface), and is a pivot mirror (galvanomirror) that is rotatable (pivotable) about a second rotation axis (pivot axis) that is parallel to the X-direction. The second deflection unit 50 is capable of scanning the target object in the Y-direction by deflecting illumination light with the rotating deflection surface.

The optical apparatus 1 according to the present exemplary embodiment is capable of scanning the target object in two directions of the X- and Y-directions that are orthogonal to each other using two deflection units of the first deflection unit 30 and the second deflection unit 50. This configuration can increase a scanning range (scanning field angle) in comparison with a configuration that enables scanning of the target object in one direction. For example, the first deflection unit 30 and the second deflection unit 50 may be a common unit by adopting a single deflection unit capable of two-dimensionally scanning the target object, such as a mirror that is rotatable about two axes (two-axis driven mirror). As the two-axis driven mirror, for example, a micro electro mechanical system (MEMS) mirror can be adopted.

A type and the number of each of the first deflection unit 30 and the second deflection unit 50 are not limited to those described above, and can be set as appropriate. For example, a galvanometer mirror similar to that used as the second deflection unit 50 may be adopted as the first deflection unit 30, a polygon mirror similar to that used as the first deflection unit 30 may be adopted as the second deflection unit 50, and a MEMS mirror may be adopted as each deflection unit. Each deflection unit is not limited to a unit that is rotatable by 360 degrees, and a rotation angle (pivot angle) may be restricted, as necessary.

The light receiving unit 60 includes an optical filter 61, an optical element 62, and a light receiving element (photoelectric conversion element). The optical filter 61 is a member for passing desired light therethrough and blocking (absorbing) unnecessary light other than the desired light. The optical filter 61 according to the present exemplary embodiment is a band-pass filter that causes light with a wavelength band corresponding to illumination light emitted from the light source 11 to permeate therethrough. The optical element 62 is a condenser lens for condensing light having passed through the optical filter 61 onto a light receiving surface of a light receiving element 63. The configuration of the optical filter 61 and optical element 62 is not limited to that of the present exemplary embodiment. For example, the arrangement order of each member may be replaced or a plurality of respective members may be arranged. The light receiving element 63 is an element (sensor) for receiving light from the optical element 62, performing photoelectric conversion, and outputting a signal. As the light receiving element 63, an element consisting of a photo diode (PD), an avalanche photo diode (APD), a single photon avalanche diode (SPAD), or the like can be adopted.

The second light guiding unit 70 is a member for guiding illumination light from the light source unit 10 to the light receiving unit 60.

As illustrated in FIG. 2B, the second light guiding unit 70 is arranged so as to receive light without going through the target object among illumination light from the first deflection unit 30. That is, an incident surface 71 of the second light guiding unit 70 is arranged at a position where illumination light deflected by the first deflection unit 30 passes therethrough when the deflection surface of the first deflection unit 30 is at a deflection angle at which the first deflection unit 30 does not scan the target object. Since light from the second light guiding unit 70 reaches the light receiving unit 60 without going through the target object, an output (reference signal) from the light receiving unit 60 corresponding to light from the second light guiding unit 70 is not changed depending on a type of the target object, a distance to the target object, or the like. Hence, with use of the reference signal, it is possible to correct the distance information about the target object and detect abnormality of the optical apparatus 1.

The second light guiding unit 70 according to the present exemplary embodiment is arranged so as to guide light reflected in the reflective region 204 of the first light guiding unit 20 without going through the target object, among illumination light from the first deflection unit 30. That is, the incident surface 71 of the second light guiding unit 70 is arranged at a position where illumination light deflected by both the first deflection unit 30 and the reflective region 204 passes therethrough when the deflection surface of the first deflection unit 30 is at the deflection angle at which the first deflection unit 30 does not scan the target object. This configuration enables arrangement of the incident surface 71 of the second light guiding unit 70 in a space between the first light guiding unit 20 or the light receiving unit 60 and the first deflection unit 30 in the direction (X-direction) that is parallel to the optical axis of the light source unit 10, and can thereby downsize the entire apparatus.

Assuming that an attempt is made to cause light that is not incident on the reflective region 204, among illumination light from the first deflection unit 30, to be incident on the second light guiding unit 70, the incident surface 71 needs to be arranged between the first light guiding unit 20 and the light receiving unit 60 or between the first light guiding unit 20 and the optical system 40. In this case, since each space between the first light guiding unit 20 and the light receiving unit 60 or between the first light guiding unit 20 and the optical system 40 is small as illustrated in FIGS. 1, 2A, and 2B, the members are to be distanced from each other to arrange the incident surface 71 in the space, and it becomes difficult to downsize the entire apparatus. In contrast, a space between the first light guiding unit or the light receiving unit 60 and the first deflection unit 30 is relatively large, it is possible to arrange the incident surface 71 while preventing an increase in size of the entire apparatus.

The second light guiding unit 70 according to the present exemplary embodiment is an optical fiber set to have a predetermined length. Adopting the optical fiber as the second light guiding unit 70 can facilitate routing of its light path while ensuring a predetermined light path length, and can thereby prevent the increase in size of the entire apparatus while preventing the light path from interfering with the other members. The second light guiding unit 70, however, may consist of an optical element such as a reflective element (mirror) and a refractive element (a lens or a prism), as necessary. In this case, the second light guiding unit 70 is to have a configuration in which the position of each optical element does not change, that is, the light path in the second light guiding unit 70 does not change.

As illustrated in FIG. 2B, light from the second light guiding unit 70 is incident on the light receiving unit 60 via the first light guiding unit 20. That is, an exit surface 72 of the second light guiding unit 70 is arranged so that light emitted from the exit surface 72 travels to the light receiving unit 60 via the first light guiding unit 20. This configuration facilitates the routing of the light path in comparison with a configuration in which light from the exit surface 72 is incident on the light receiving unit 60 without going through the first light guiding unit 20, and can thereby downsize the entire apparatus. In the present exemplary embodiment, for implementation of such a configuration as to cause light from the exit surface 72 to pass through the first light guiding unit 20 and travel to the light receiving unit 60, the exit surface 72 is arranged to face the first surface 201 on the opposite side of the light receiving unit 60 with respect to the first light guiding unit 20.

In the present exemplary embodiment, as illustrated in FIG. 3B, the exit surface 72 is arranged so that light from the second light guiding unit 70 passes through the second passing region 205 of the first light guiding unit 20 and travels to the light receiving unit 60. This can prevent generation of unnecessary light that is reflected on an inner surface or the like of a holding unit (barrel) holding each member of the light receiving unit 60 and that is incident on the light receiving element 63 among light from the second light guiding unit 70, and can prevent generation of noise in an output from the light receiving element 63. Especially, emitted light from the optical fiber generally has a large spread angle, the effect becomes significant in a case where the optical fiber is used as the second light guiding unit 70. Hence, the size of the second passing region 205 is to be set so as to block such unnecessary light. The exit surface 72, however, may be arranged so that light from the second light guiding unit 70 passes through the first passing region 203 of the first light guiding unit 20 and travels to the light receiving unit 60, as necessary.

Figure 4B:
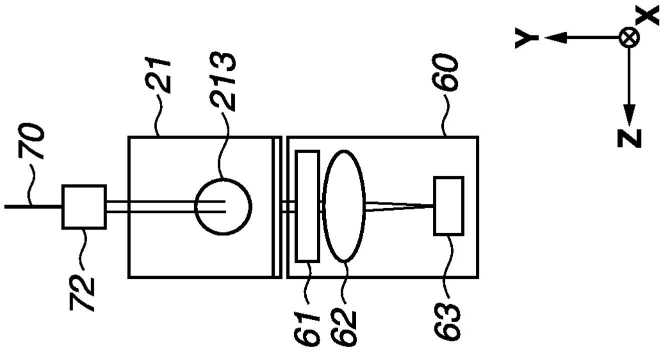
FIGS. 4A and 4B are schematic views each illustrating a main section of a first light guiding unit according to a modification.
Figure 4A:
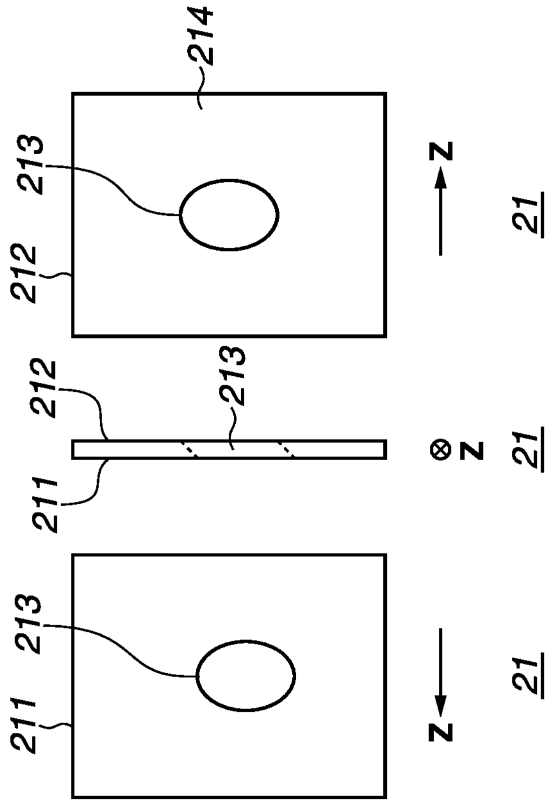

An optical apparatus according to a modification of the first exemplary embodiment is now described. FIGS. 4A and 4B are schematic views each illustrating a main section of a first light guiding unit 21 according to the modification. Assume that the optical apparatus according to the modification is similar to the optical apparatus 1 according to the first exemplary embodiment excluding the configuration of the first light guiding unit 21 and the arrangement of the second light guiding unit 70. FIG. 4A is a diagram illustrating a first surface 211 of the first light guiding unit 21 on the light source unit 10 side and a second surface 212 of the first light guiding unit 21 on the first deflection unit 30 side when viewed from a normal direction, and a cross-sectional view (XY cross section) at a position including a first passing region 213 of the first light guiding unit 21. FIG. 4B is a diagram illustrating the light paths illustrated in FIG. 2B when viewed from the −X side.

The first light guiding unit 21 according to the modification includes, similarly to the first light guiding unit 20 according to the first exemplary embodiment, the first surface 211, the second surface 212, the first passing region 213 arranged on the first surface 211 and the second surface 212, and a reflective region 214 arranged on the second surface 212. Meanwhile, the first light guiding unit 21 is not provided with an aperture corresponding to the second passing region 205 of the first light guiding unit 20 according to the first exemplary embodiment. In the present modification, as illustrated in FIG. 4B, the exit surface 72 is arranged so that light from the second light guiding unit 70 passes through the first passing region 213 of the first light guiding unit 21 and is incident on the light receiving unit 60.

The modification eliminates the need for arranging the second passing region 205 in the first light guiding unit 21, and can thereby downsize the first light guiding unit 21 and reduce manufacturing cost in comparison with the first exemplary embodiment.

As described above, in the first exemplary embodiment and the modification thereof, light from the second light guiding unit 70 is incident on the light receiving element 63 via the optical element 62. With this configuration, the exit surface 72 of the second light guiding unit 70 can be arranged at a correct position with respect to the light receiving element 63, and thereby light can be incident on the light receiving element 63 from a direction substantially orthogonal to the light receiving surface of the light receiving element 63. With this configuration, an increase in size of the entire apparatus and a decrease of accuracy of light detection by the light receiving element 63 can be prevented, in comparison with a configuration in which light from the second light guiding unit 70 is incident on the light receiving element 63 without going through the optical element 62, that is, a configuration in which light from the exit surface 72 is obliquely incident on the light receiving element 63.

As illustrated in FIG. 1 and FIG. 2A, illumination light from the light source unit 10 on the first light path according to the present exemplary embodiment passes through the first passing region 203 from the first surface 201 side of the first light guiding unit 20 and is incident on the deflection surface of the first deflection unit 30. Illumination light deflected by the first deflection unit 30 is deflected by the second deflection unit 50 via the optical system 40 and travels to the target object, which is not illustrated. Reflected light from the target object is, after sequentially going through the second deflection unit 50, the optical system 40, and the first deflection unit 30 in this order, incident on the second surface 202 of the first light guiding unit 20, is reflected by the reflective region 204, and is incident on the light receiving unit 60.

As illustrated in FIGS. 2B and 3B, illumination light from the light source unit 10 on the second light path according to the present exemplary embodiment passes through the first passing region 203 from the first surface 201 side of the first light guiding unit 20 and is incident on the deflection surface of the first deflection unit 30. Illumination light deflected by the first deflection unit 30 is incident on the second surface 202 of the first light guiding unit 20 at a scanning field angle at which illumination light is not incident on the optical system 40, is reflected by the reflective region 204, and is incident on the incident surface 71 of the second light guiding unit 70. Illumination light from the incident surface 71 of the second light guiding unit 70 propagates through the inside of the second light guiding unit 70, is emitted from the exit surface 72 of the second light guiding unit 70, and is incident on the light receiving unit 60 via the first passing region 203 of the first light guiding unit 20.

The deflection surface of the first deflection unit 30 according to the present exemplary embodiment is arranged at a position of an entrance pupil of the optical system 40. The deflection surface of the second deflection unit 50 according to the present exemplary embodiment is arranged at a position of an exit pupil of the optical system 40. With this configuration, the deflection surface of each deflection unit can be downsized, and thereby the entire apparatus can be downsized and a load on a drive unit for driving each deflection unit can be reduced. The drive unit is not illustrated. The deflection surface of each deflection unit, however, may be arranged at a position that is shifted from a pupil position of the optical system 40, as necessary.

The control unit 80 controls the light source 11, the first deflection unit 30, the second deflection unit 50, the light receiving element 63, and the like. The control unit 80 is, for example, a processing device such as a central processing unit (CPU), or an arithmetic device (computer) provided with the processing device. The control unit 80 drives each of the light source 11, the first deflection unit 30, and the second deflection unit 50 at a predetermined drive voltage and a predetermined drive frequency. The control unit 80 is, for example, capable of controlling the light source 11 to convert illumination light into pulsed light, and also capable of performing intensity modulation on illumination light to generate signal light.

The control unit 80 is capable of acquiring distance information about the target object based on a period of time from a time when illumination light is emitted from the light source 11 (emission time) to a time when reflected light from the target object is received by the light receiving element 63 (reception time). At this time, the control unit 80 may acquire a signal from the light receiving element 63 at a specific frequency. The control unit 80 may acquire distance information based on a phase of reflected light from the target object, instead of the period of time until reception of reflected light from the target object. Specifically, the control unit 80 may obtain a difference between a phase of a signal from the light source 11 and a phase of a signal output from the light receiving element 63 (phase difference) and multiply the phase difference by light speed to acquire the distance information about the target object.

The control unit 80 acquires an output (reference signal) from the light receiving element 63. The output corresponds to illumination light that has gone through the second light guiding unit 70, in which the light path length is fixed. The control unit 80 is capable of correcting, based on the reference signal, the distance information acquired based on the output from the light receiving element 63 corresponding to reflected light from the target object. In this way, measurement accuracy of the optical apparatus 1 can be guaranteed. The control unit 80 is capable of detecting abnormality of the optical apparatus 1 based on the output from the light receiving element 63 in a state where the light receiving unit 60 does not receive reflected light from the target object. The control unit 80 is, when detecting the abnormality, temporarily stopping the operation of the optical apparatus 1 or notifying a user of the abnormality, and can thereby ensure reliability of the optical apparatus 1.

For example, on the light path passing through the second light guiding unit 70 illustrated in FIG. 2B, there are conceivable cases where the light receiving element 63 does not receive illumination light despite emission of light from the light source 11 and where an amount of illumination light received by the light receiving element 63 significantly decreases. In these cases, there is a possibility that abnormality (malfunction) occurs in at least one of the light source 11, the light receiving element 63, or the first deflection unit 30. Such abnormality can be detected by an output (signal) from the light receiving element 63 in a state where the light receiving element 63 does not receive reflected light from the target object, that is, a state where the deflection angle of the deflection surface of the first deflection unit 30 is an angle at which the first deflection unit 30 deflects illumination light to the second light guiding unit 70.

In a case where the optical apparatus 1 according to the present exemplary embodiment is used as the distance-measuring apparatus, the optical apparatus 1 is, for example, for an in-vehicle system is to be arranged in an automobile (vehicle) and a fixed-point monitoring system is to be arranged in a traffic light machine or the like. An object (target object) serving as a target of measurement by the optical apparatus 1 in the in-vehicle system or the fixed-point monitoring system is, for example, a pedestrian, an obstacle, or a vehicle, and is assumed to be away from the optical apparatus 1 by about 1 to 300 m. The optical apparatus 1 according to the present exemplary embodiment is capable of detecting the target object in a range from a close distance to a long distance. The in-vehicle system and the fixed-point monitoring system are each capable of performing control of the vehicle, detection of the obstacle, and the like based on the distance information about the target object acquired by the optical apparatus 1.

Figure 5B:
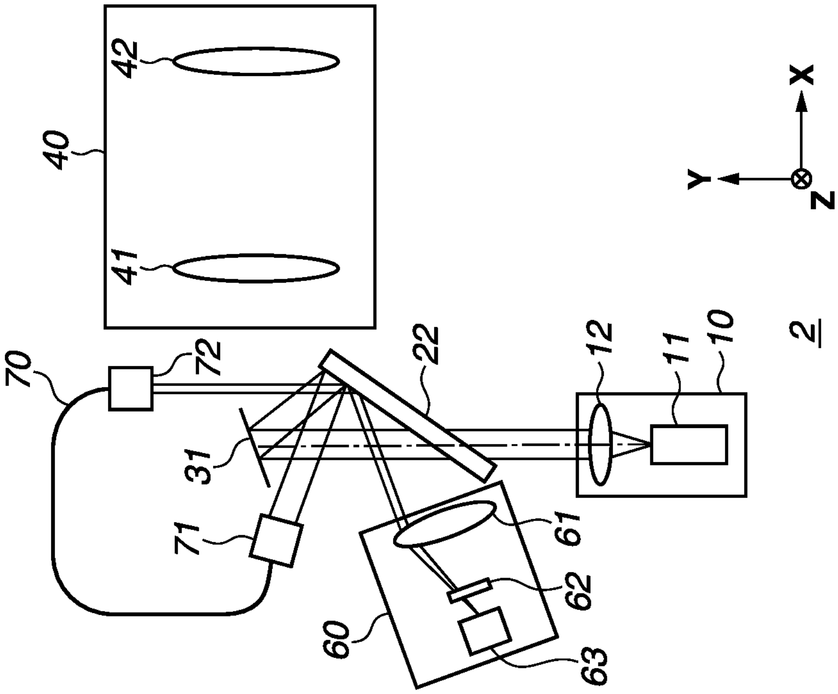
FIGS. 5A and 5B are schematic views each illustrating a main section of an optical apparatus according to a second exemplary embodiment.
Figure 5A:
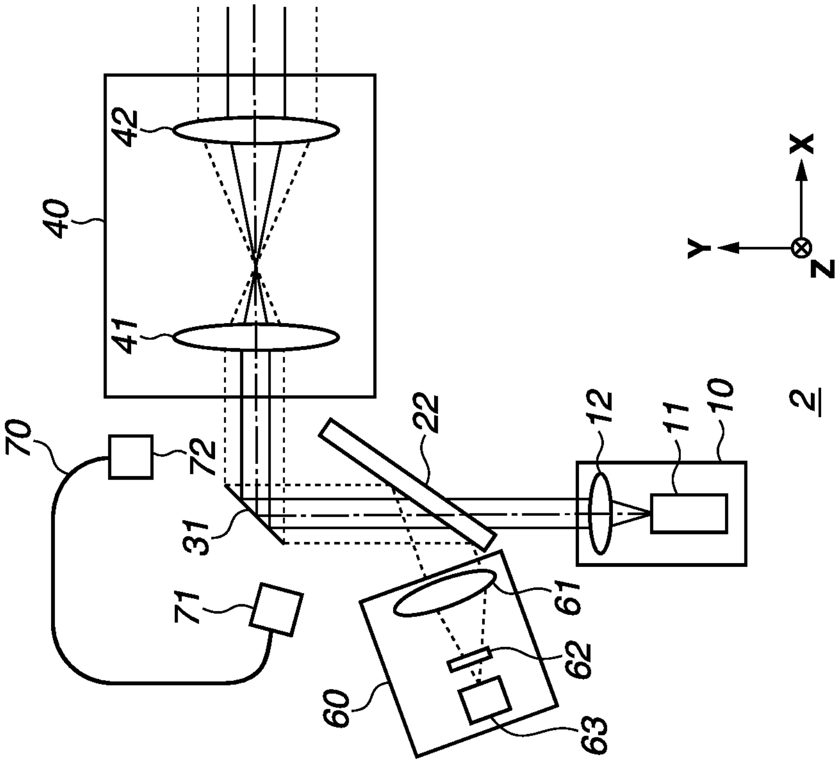

FIGS. 5A and 5B are schematic views (schematic diagrams) each illustrating a main section on a cross section (XZ cross section) including an optical axis of an optical apparatus 2 according to a second exemplary embodiment of the present invention. FIG. 5A illustrates the first light path when illumination light travels from the light source unit 10 to the target object. FIG. 5B illustrates the second light path when illumination light from the light source unit 10 travels to the second light guiding unit 70 without going through the target object. In the optical apparatus 2 according to the present exemplary embodiment, a description of a configuration that is equivalent to that of the optical apparatus 1 according to the above-mentioned first exemplary embodiment is omitted.

The optical apparatus 2 according to the present exemplary embodiment includes the light source unit 10, a first light guiding unit 22, a first deflection unit 31, the optical system 40, the light receiving unit 60, the second light guiding unit 70, and a control unit, which is not illustrated. The optical apparatus 2 is, however, to include at least the first light guiding unit 22, the first deflection unit 31, and the second light guiding unit 70, and the other members may be different devices (units) detachably mounted on the optical apparatus 2, as necessary. The control unit according to the present exemplary embodiment is not illustrated in FIGS. 5A and 5B, but the control unit is assumed to have functions similar to those of the control unit 80 according to the first exemplary embodiment.

Figure 6B:
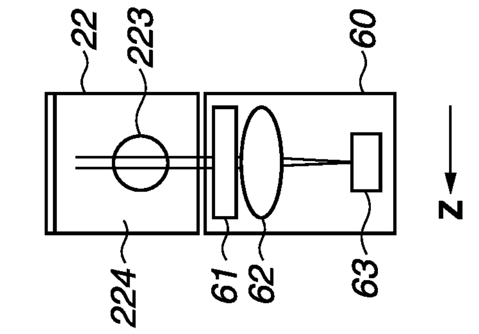
FIGS. 6A and 6B are schematic views each illustrating a main section of a first light guiding unit according to the second exemplary embodiment.
Figure 6A:
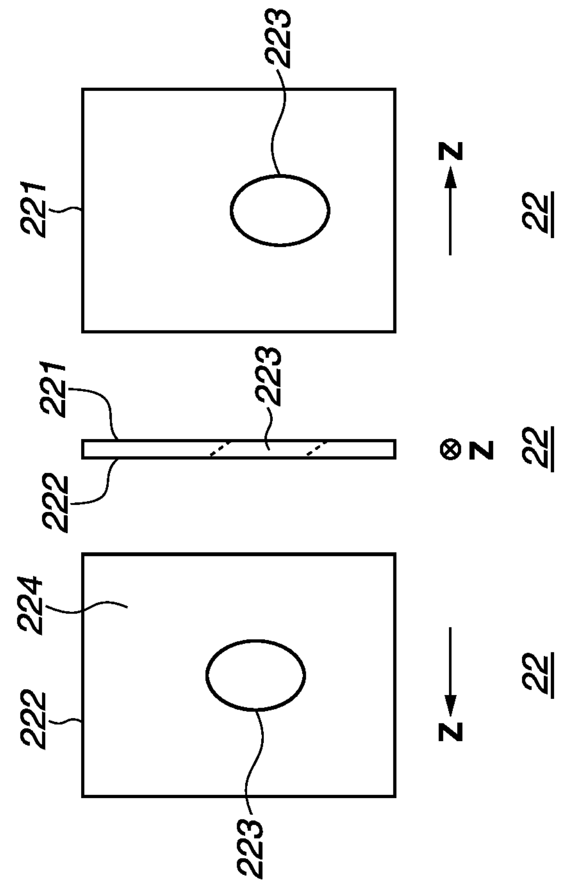

FIGS. 6A and 6B are schematic views each illustrating a main section of the first light guiding unit 22 according to the present exemplary embodiment. FIG. 6A is a diagram illustrating a first surface 221 of the first light guiding unit 22 on the light source unit 10 side and a second surface 222 of the first light guiding unit 22 on the first deflection unit 31 side when viewed from a normal direction, and a cross-sectional view (XY cross section) at a position including a first passing region 223 of the first light guiding unit 21. FIG. 6B is a diagram illustrating the light paths illustrated in FIG. 5B when viewed from a direction orthogonal to the optical axis of the light receiving unit 60. The first light guiding unit 22 includes the first passing region 223 through which illumination light from the light source unit 10 passes, and a reflective region 224 in which reflected light from the first deflection unit 31 is reflected.

The first deflection unit 31 according to the present exemplary embodiment is a mirror that is rotatable about two axes (two-axis driven mirror). Specifically, the first deflection unit 31 is a MEMS mirror including a first rotation axis (first pivot axis) that is parallel to the Z-direction and a second rotation axis (second pivot axis) that is parallel to a deflection surface of the first deflection unit 31 and that is included in the XY cross section. The first deflection unit 31 is capable of scanning the target object in two directions of the Y- and Z-directions that are orthogonal to each other. In this manner, the optical apparatus 2 according to the present exemplary embodiment includes the single first deflection unit 31 as a deflection unit unlike the optical apparatus 1 according to the first exemplary embodiment. With this configuration, the number of components can be reduced and the entire apparatus can be downsized in comparison with the optical apparatus 1.

As illustrated in FIG. 5B, the second light guiding unit 70 is arranged so as to guide, among illumination light from the first deflection unit 31, light reflected in the reflective region 224 of the first light guiding unit 22 without going through the target object to the light receiving unit 60. That is, the incident surface 71 of the second light guiding unit 70 is arranged at a position where illumination light deflected by both the first deflection unit 31 and the reflective region 224 passes therethrough when the first deflection unit 31 is at a deflection angle at which the first deflection unit 31 does not scan the target object. With this configuration, illumination light can be guided to the second light guiding unit 70 utilizing a space between the first light guiding unit 22 or the light receiving unit 60 and the first deflection unit 31 in the direction (Y-direction) that is parallel to the optical axis of the light source unit 10, and thereby the entire apparatus can be downsized.

As illustrated in FIG. 5B, light from the second light guiding unit 70 is incident on the light receiving unit 60 via the first light guiding unit 22. That is, the exit surface 72 of the second light guiding unit 70 is arranged so that light emitted from the exit surface 72 travels to the light receiving unit 60 via the first light guiding unit 22. With this configuration, routing of the light path can be facilitated in comparison with a configuration in which light from the exit surface 72 is incident on the light receiving unit 60 without going through the first light guiding unit 22, and thereby the entire apparatus can be downsized. In the present exemplary embodiment, the exit surface 72 is arranged between the first deflection unit 31 and the optical system 40 in the optical axis direction (X-direction) of the optical system 40. For implementation of such a configuration as to cause light from the exit surface 72 to pass through the first light guiding unit 22 and travel to the light receiving unit 60, the exit surface 72 is arranged to face the second surface 222 on the opposite side of the light receiving unit 60 with respect to the first light guiding unit 22.

The exit surface 72 according to the present exemplary embodiment is arranged so that light emitted from the exit surface 72 is reflected in the reflective region 224 of the first light guiding unit 22 and travels to the light receiving unit 60. In this manner, adopting the configuration of guiding light emitted from the second light guiding unit 70 to the light receiving unit 60 using the reflective region 224 eliminates the need for arranging a second passing region different from the first passing region 223 in the first light guiding unit 22. Hence, the optical apparatus 2 according to the present exemplary embodiment enables downsizing of the first light guiding unit 22 and reduction of manufacturing cost in comparison with that of the first exemplary embodiment.

The incident surface 71 of the second light guiding unit 70 according to the present exemplary embodiment is arranged at a position where illumination light passes therethrough when the first deflection unit 30 is at the deflection angle at which the first deflection unit 30 does not scan the target object on the XY cross section illustrated in FIG. 5B. That is, the incident surface 71 is arranged at a scanning field angle outside a scanning range for scanning the target object when the first deflection unit 31 rotates about the first rotation axis. The incident surface 71, however, may be arranged at a scanning field angle outside a scanning range for scanning the target object when the first deflection unit 31 rotates about the second rotation axis, as necessary.

[In-Vehicle System]

Figure 7:
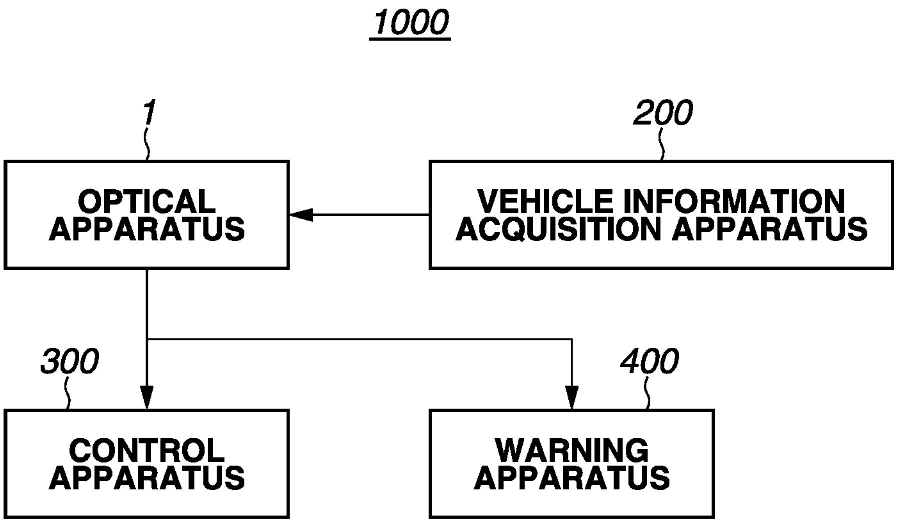
FIG. 7 is a functional block diagram illustrating an in-vehicle system according to an exemplary embodiment.

FIG. 7 is a block diagram of the optical apparatus 1 according to the present exemplary embodiment and an in-vehicle system (driving assistance apparatus) 1000 including the optical apparatus 1. An in-vehicle system 1000 is an apparatus that is held by a moving member (moving apparatus) capable of moving such as an automobile (vehicle), and that is used for assisting driving (steering) of the vehicle based on distance information regarding the target object such as an obstacle and a pedestrian around the vehicle and acquired by the optical apparatus 1.

Figure 8:
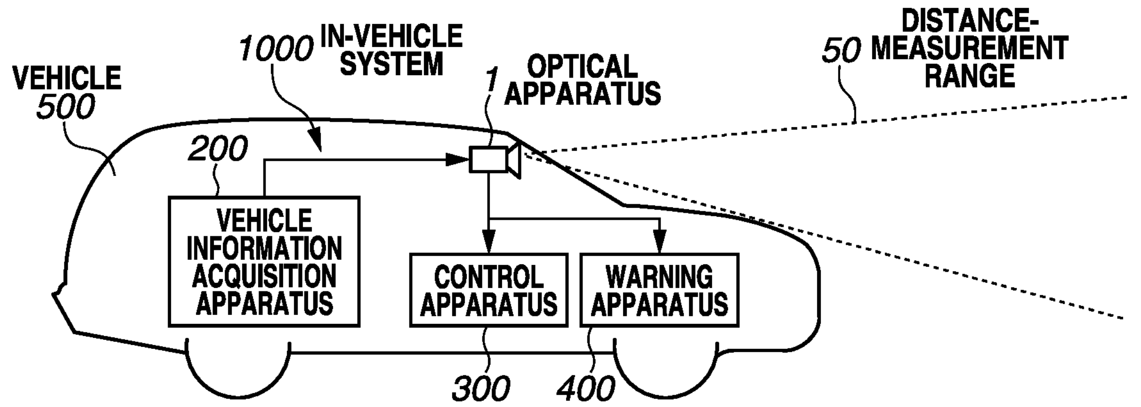
FIG. 8 is a schematic diagram illustrating a vehicle (moving apparatus) according to the exemplary embodiment.

FIG. 8 is a schematic diagram illustrating a vehicle (moving apparatus) 500 including the in-vehicle system 1000. While FIG. 8 illustrates a case where a distance-measurement range (detection range) of the optical apparatus 1 is set ahead of the vehicle 500, the distance-measurement range may be set behind the vehicle 500, laterally to the vehicle 500, or the like.

As illustrated in FIG. 7, the in-vehicle system 1000 includes the optical apparatus 1, a vehicle information acquisition apparatus 200, a control apparatus (electronic control unit (ECU)) 300, and a warning apparatus (warning unit) 400. In the in-vehicle system 1000, the control unit 80 included in the optical apparatus 1 has functions as a distance acquisition unit (acquisition unit) and a collision determination unit (determination unit). In the in-vehicle system 1000, however, the distance acquisition unit and the collision determination unit may be separately arranged aside from the control unit 80, and may be arranged outside the optical apparatus 1 (for example, inside the vehicle 500), as necessary. Alternatively, the control apparatus 300 may be used as the control unit 80.

Figure 9:
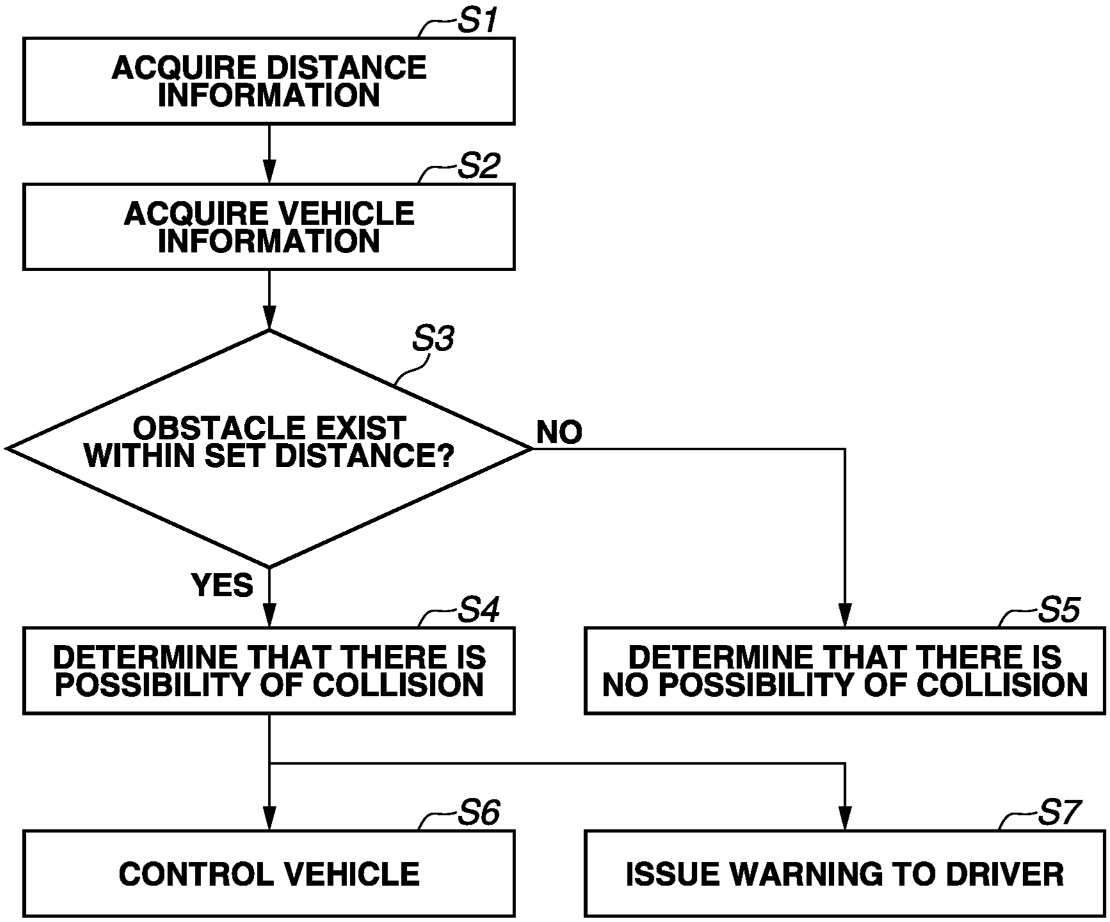
FIG. 9 is a flowchart describing an operation example of the in-vehicle system according to the exemplary embodiment.

FIG. 9 is a flowchart describing an operation example of the in-vehicle system 1000 according to the present exemplary embodiment. The operation of the in-vehicle system 1000 is described along this flowchart.

First, in step S1, the light source unit 10 of the optical apparatus 1 illuminates the target object around the vehicle, and the control unit 80 acquires distance information about the target object based on a signal output from the light receiving unit 60 in response to reception of reflected light from the target object. In step S2, the vehicle information acquisition apparatus 200 acquires vehicle information including vehicle speed of the vehicle, a yaw rate, and a rudder angle. In step S3, the control unit 80 uses the distance information acquired in step S1 and the vehicle information acquired in step S2 to determine whether a distance to the target object is included in a range of a preliminarily set distance.

In this way, it is possible to determine whether the target object exists within the set distance around a vehicle and determine a possibility of collision between the vehicle and the target object. The processing in step S1 and the processing in step S2 may be performed in a reverse order of the above-mentioned order, or may be performed in parallel. In a case where the target object exists within the set distance (YES in step S3), the processing proceeds to step S4. In step S4, the control unit 80 determines that "there is a possibility of collision". In a case where no target object exists within the set distance (NO in step S3), the processing proceeds to step S5. In step S5, the control unit 80 determines that "there is no possibility of collision".

Subsequently, in a case of determining that "there is a possibility of collision", the control unit 80 notifies a control apparatus 300 or a warning apparatus 400 of a result of the determination (transmits the result of the determination to the control apparatus 300 or the warning apparatus 400). At this time, in step S6, the control apparatus 300 controls the vehicle based on the result of determination made by the control unit 80. In step S7, the warning apparatus 400 issues a warning to a user (driver) of the vehicle based on the result of the determination made by the control unit 80. It is to notify at least one of the control apparatus 300 or the warning apparatus 400 of the result of the determination.

The control apparatus 300 performs, for example, control to put a brake, release an accelerator, turn a steering wheel, and generate a control signal for generating braking force on each wheel to suppress an output from an engine or a motor. The warning apparatus 400 issues a warning to the driver by, for example, producing a warning sound, displaying warning information on a screen of a car navigation system or the like, and applying vibrations to a seatbelt or a steering wheel.

The in-vehicle system 1000 according to the present exemplary embodiment is capable of detecting the target object and measuring a distance to the target object by performing the above-mentioned processing, and capable of avoiding collision between the vehicle and target object. Especially, in a case where the optical apparatus 1 according to each exemplary embodiment described above is applied to the in-vehicle system 1000, distance measurement can be implemented with high accuracy, and thereby the target object can be detected and collision can be determined with high accuracy.

In the present exemplary embodiment, the in-vehicle system 1000 is applied to driving assistance (collision damage reduction). The application is, however, not limited the above example, and the in-vehicle system 1000 may be applied to cruise control (including cruise control with all vehicle speed tracking function), automated driving, and the like. The in-vehicle system 1000 can be applied to, not only a vehicle such as an automobile, but to, for example, a moving member such as a ship, an airplane, and an industrial robot. The application of the in-vehicle system 1000 is not limited to the moving member, and the in-vehicle system 1000 can be applied to various kinds of equipment utilizing object recognition such as an intelligent transport system (ITS) and a monitoring system.

The in-vehicle system 1000 and the moving apparatus 500 may include a notification apparatus (notification unit) for notifying, if by any chance the moving apparatus 500 collides with an obstacle, a manufacturer (maker) of the in-vehicle system 1000, a distributor (dealer) of the moving apparatus 500, or the like of the collision. For example, it is possible to adopt, as the notification apparatus, an apparatus that transmits information about collision between the moving apparatus 500 and the obstacle (collision information) to a preliminarily set notification destination via an electronic mail or the like.

In this manner, adopting the configuration of automatically making notification of the collision information using the notification apparatus enables prompt response such as inspection and repair after the collision. The notification destination of the collision information may be a destination that is freely set by the user, such as an insurance company, a medical institution, and the police.

Information is not limited to the collision information, and the notification apparatus may be configured to notify the notification destination of failure information about each unit or consumption information about consumable products. The notification apparatus may detect whether the collision has occurred using the distance information acquired based on an output from the above-mentioned light receiving unit 60, or using another detection unit (sensor).

[Modification]

While the description has been given of the exemplary embodiments and working examples, the present invention is not limited to these exemplary embodiments and working examples, and can be combined, modified, and changed in various manners without departing from the scope of the present invention.

For example, another optical element may be arranged on a light path between the first light guiding unit and the first deflection unit, as necessary. However, in consideration of a possibility that light reflected on an optical surface of the optical element is incident on the light receiving unit as unnecessary light, nothing is to be arranged on the light path between the first light guiding unit and the first deflection unit like the above-mentioned exemplary embodiments. In other words, a configuration in which illumination light from the passing region of the first light guiding unit is incident on the first deflection unit without going through another surface is adopted.

In each exemplary embodiment, a parallel plate is adopted as a base material of the first light guiding unit and the first surface and second surface of the first light guiding unit are parallel surfaces, but the first surface and the second surface may be non-parallel surfaces, as necessary. At least one of the first surface and the second surface may be a curved surface, as necessary. It is, however, in one embodiment, the first surface and the second surface are to be flat surfaces and an angle formed by each surface be small, so as to facilitate manufacturing of the first light guiding unit.

In each exemplary embodiment, each member is integrally held by a holding member (housing), which is not illustrated, but may be configured as a different member, as necessary. For example, the first light guiding unit and the first deflection unit may be detachably mounted to each other. In this case, a connection unit (coupling unit) for connecting the first light guiding unit and the first deflection unit is to be arranged in the holding member for holding each member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-026811, filed Feb. 24, 2022, which is hereby incorporated by reference herein in its entirety.

What is claimed is:

1. An optical apparatus comprising:

a first deflection unit configured to deflect illumination light from a light source unit to scan an object, and deflect reflected light from the object;

a first light guiding unit configured to guide the illumination light from the light source unit to the first deflection unit, and guide the reflected light from the first deflection unit to a light receiving unit; and a second light guiding unit configured to guide the illumination light from the light source unit to the light receiving unit, wherein the first light guiding unit includes a first passing region through which the illumination light from the light source unit passes and a reflective region in which the reflected light from the first deflection unit is reflected, wherein the second light guiding unit is configured to guide, a part of the illumination light to the light receiving unit, and wherein the part of the illumination light (i) passes through the first passing region, (ii) is deflected by the first deflection unit, and (iii) reflected in the reflective region without going through any other member.

2. The optical apparatus according to claim 1, wherein light from the second light guiding unit is incident on the light receiving unit via the first light guiding unit.

3. The optical apparatus according to claim 1, wherein the first deflection unit is configured to be rotatable about a first rotation axis, and the first rotation axis is non-parallel to an optical axis of the light source unit.

4. The optical apparatus according to claim 1, further comprising an optical system configured to guide the illumination light from the first deflection unit to the object and guide the reflected light from the object to the first deflection unit.

5. An optical apparatus comprising:

a first deflection unit configured to deflect illumination light from a light source unit to scan an object, and deflect reflected light from the object;

a first light guiding unit configured to guide the illumination light from the light source unit to the first deflection unit, and guide the reflected light from the first deflection unit to a light receiving unit;

a second light guiding unit configured to guide the illumination light from the light source unit to the light receiving unit; and an optical system configured to increase a diameter of the illumination light from the first deflection unit and decrease a diameter of the reflected light from the object, wherein the first light guiding unit includes a first passing region through which the illumination light from the light source unit passes and a reflective region in which the reflected light from the first deflection unit is reflected, and wherein the second light guiding unit is configured to guide, to the light receiving unit, light reflected in the reflective region without going through the object among the illumination light from the first deflection unit.

6. The optical apparatus according to claim 4, wherein a deflection surface of the first deflection unit is arranged at a position of an entrance pupil of the optical system.

7. The optical apparatus according to claim 1, further comprising a second deflection unit configured to deflect the illumination light from the first deflection unit to scan the object and deflect the reflected light from the object to guide the reflected light to the first deflection unit.

8. The optical apparatus according to claim 7, further comprising an optical system configured to guide the illumination light from the first deflection unit to the second deflection unit and guide the reflected light from the second deflection unit to the first deflection unit.

9. The optical apparatus according to claim 8, wherein a deflection surface of the second deflection unit is arranged at a position of an exit pupil of the optical system.

10. An optical apparatus comprising:

a first deflection unit configured to deflect illumination light from a light source unit to scan an object, and deflect reflected light from the object;

a first light guiding unit configured to guide the illumination light from the light source unit to the first deflection unit, and guide the reflected light from the first deflection unit to a light receiving unit; and a second light guiding unit configured to guide the illumination light from the light source unit to the light receiving unit, wherein the first light guiding unit includes a first passing region through which the illumination light from the light source unit passes and a reflective region in which the reflected light from the first deflection unit is reflected, and wherein the second light guiding unit is configured to guide, to the light receiving unit, light reflected in the reflective region without going through the object among the illumination light from the first deflection unit, and wherein an incident surface of the second light guiding unit is arranged between the first light guiding unit and the first deflection unit in a direction that is parallel to an optical axis of the light source unit.

11. The optical apparatus according to claim 1, wherein an exit surface of the second light guiding unit is arranged on an opposite side of the light receiving unit with respect to the first light guiding unit.

12. The optical apparatus according to claim 1, wherein the first light guiding unit includes a second passing region through which light from the second light guiding unit passes.

13. The optical apparatus according to claim 1, wherein the reflected light from the object is not incident on the second light guiding unit.

14. The optical apparatus according to claim 1, wherein light from the second light guiding unit is reflected in the reflective region and incident on the light receiving unit.

15. The optical apparatus according to claim 1, further comprising a third light guiding unit configured to guide the reflected light from the object reflected by the reflective region to the light receiving unit.

16. The optical apparatus according to claim 1, wherein the light receiving unit includes an optical element and a light receiving element configured to receive light from the light receiving element, and light from the second light guiding unit is incident on the light receiving element via the optical element.

17. The optical apparatus according to claim 1, further comprising a control unit configured to acquire distance information about the object based on an output from the light receiving unit, the output corresponding to the reflected light from the object.

18. The optical apparatus according to claim 17, wherein the control unit is configured to correct the distance information based on an output from the light receiving unit, the output corresponding to light from the second light guiding unit.

19. The optical apparatus according to claim 17, wherein the control unit is configured to detect abnormality of the optical apparatus based on an output from the light receiving unit in a state where the light receiving unit does not receive the reflected light.

20. An in-vehicle system comprising:

the optical apparatus according to claim 1, wherein the in-vehicle system is configured to determine a possibility of collision between a vehicle and the object based on distance information about the object acquired by the optical apparatus.

21. A moving apparatus comprising:

the optical apparatus according to claim 1, wherein the moving apparatus is configured to hold the optical apparatus and is movable.

22. The moving apparatus according to claim 21, wherein the moving apparatus is configured to determine a possibility of collision with the object based on distance information about the object acquired by the optical apparatus.

* * * * *